United States Patent [19]

Nardozzi

[11] Patent Number: 5,179,637
[45] Date of Patent: Jan. 12, 1993

[54] METHOD AND APPARATUS FOR DISTRIBUTING PRINT JOBS AMONG A NETWORK OF IMAGE PROCESSORS AND PRINT ENGINES

[75] Inventor: Frank M. Nardozzi, Webster, N.Y.

[73] Assignee: Eastman Kodak Company, Rochester, N.Y.

[21] Appl. No.: 801,340

[22] Filed: Dec. 2, 1991

[51] Int. Cl.$^5$ .............................. G06K 15/00
[52] U.S. Cl. ..................... 395/114; 395/163
[58] Field of Search ............... 395/101, 112, 114, 163; 358/402, 403, 407; 346/154; 400/71

[56] References Cited

U.S. PATENT DOCUMENTS

| | | | |
|---|---|---|---|
| 4,710,783 | 12/1987 | Caine et al. | 346/76 |
| 4,754,428 | 6/1988 | Schultz et al. | 395/114 |
| 4,941,108 | 7/1990 | Aoyagi et al. | 364/519 |
| 4,947,345 | 8/1990 | Paradise et al. | 364/519 |
| 4,954,968 | 9/1990 | Yamaguchi et al. | 364/519 |
| 4,958,303 | 9/1990 | Assarpour et al. | 364/521 |
| 4,965,750 | 10/1990 | Matsuo et al. | 364/521 |
| 4,999,654 | 3/1991 | Maruo et al. | 346/160 |
| 5,047,957 | 9/1991 | Ikenoue | 395/114 |

Primary Examiner—Arthur G. Evans
Attorney, Agent, or Firm—Raymond L. Owens

[57] ABSTRACT

A system for distributing print jobs received from a print image data source among a set of print engines and associated image processors of the type having an input data bus; a scheduler coupled to said input data bus for receiving encoded data from a print image data source; a set of image processors and associated print engines each coupled to one another by a print engine data bus; and a distributed network bidirectional data bus having initiator and target identification capabilities coupled to the scheduler and to each image processor in parallel arrangement. The system employs the improved method comprising the steps of transferring the encoded data received in said scheduler to one of said image processors that is not currently processing received encoded data; processing the encoded data in said transferee image processor to develop a set of print engine operating data files representing print images and pages comprising a complete print job, together with data indicating the number of copies of each such image or page to be printed and the medium on which it is to be printed; identifying print engines that are free and capable of printing images or pages of the print order; and distributing the print engine operating data files on the distributed network bidirectional data bus to the free print engines through their respective image processors until all images or pages of the print order are printed.

5 Claims, 4 Drawing Sheets

METHOD AND APPARATUS FOR DISTRIBUTING PRINT JOBS AMONG A NETWORK OF IMAGE PROCESSORS AND PRINT ENGINES

BACKGROUND OF THE INVENTION

1. Field of the Invention

The present invention relates to an architecture for a high volume printing system employing a number of print engines and the distribution of print jobs therebetween.

2. Description of the Prior Art

In recent years efforts have been made to enhance the speed, quality and versatility of printing text and other images, in black and white or in color, to match the capabilities of source image generators. The enhanced speed and other capabilities of source image generators, including mainframe computers, personal computers, computer workstations and CAD/CAM systems, document scanners, facsimile transmitters and receivers, high throughput copiers, and other more specialized graphic image processing and printing for forming composite color images from source images, e.g. the Kodak Premier Image Enhancement System available from Eastman Kodak Co., and for reproducing still photographic quality prints of video image frames, e.g. the Kodak SU6500 Color Video Printer available from Eastman Kodak Co., place ever increasing demands on "print engines" which print the images generated by these source image generators. Such print engines include laser beam printers, light emitting diode printers, liquid crystal shutter printers, ink jet printers and thermal printers.

Thermal dye transfer printers capable of printing high quality color images, as disclosed in U.S. Pat. No. 4,710,783 incorporated herein by reference, have recently been developed and employed in systems which include the above-listed source image generators. The source image generators are coupled to the print engine or engines through source image signal processors which provide an encoded data set through a data bus to a print engine controller of the type shown in FIGS. 5 and 6 of the '783 patent. Further image signal processors are disclosed in U.S. Pat. No(s). 4,941,108 and 4,999,654 where the source image from a host system is processed under the control of software operating a central processing unit to provide rasterized lines of digitized video data for each image field or page through a laser beam printer/video interface to a print engine.

Usually print engines are coupled to one or more source image generators, e.g. two or more personal computers, a local area network for a set of personal computers, or to a combined document scanner and facsimile machine, as shown, for example, in U.S. Pat. No. 4,947,345. In such systems, it is necessary to provide a queue management software process for prioritizing the printing of specific types of print jobs and to provide two-way communications between the print engine, the job SCHEDULER and the source image generator. In a simple FIFO queue management system each print job is assigned by the SCHEDULER to the print engine in the order received from the network bus and the print engine indicates when it is ready to commence and has completed printing a print job. In certain systems it is desireable to prioritize certain types of orders, e.g., facsimile over copying as per the '345 patent.

In certain, high volume printing systems, it has become necessary to couple more than one print engine to one or more source image generator through a single SCHEDULER and an image processor associated with each print engine to distribute print jobs in the FIFO basis among available print engines that are capable of printing the specific job (i.e., are loaded with the appropriate size medium, are capable of color printing, etc.).

This architecture includes a connection to the source image generator by an incoming data bus BUS1. Data files pass through BUS1 to a SCHEDULER computer, which interrogates data files received through BUS1 to determine if any print engine PEm is capable of printing the data file. If a print engine PEm is capable of printing the file and an image processor, IP1-IPn, is available, the data is passed through a network bus BUS2 to the appropriate image processor, IPm. The image processor, IPm, applies one or more computer algorithms to the data file creating the rasterized image to be printed by the print engine, PEm. The print engine, PEm, will print one or more copies of the image as requested with the data file. The system throughput, measured in copies per hour, depends upon maximizing the probability of rasterized images being available and ready for printing by the print engines, PE1-PEn.

The connection of a single image processor, IPm, to a single print engine, PEm, through the interconnect bus, BUSpm, prevents multiple copies of an image to be printed by other available print engines, PE1-PEn. The image processor, IPm, is only capable of preparing images for the print engine, PEm, until it has filled its buffers. The system performance is therefore reduced by limiting the access of an image process, IPm, to only one print engine, PEm.

SUMMARY OF THE INVENTION

It is therefor an object of the present invention to increase system performance in a printing system comprising a plurality of print engines and image processors by enabling usage of available print engines in parallel operations to print a single or multiple copies of each print job in the queue while freeing all associated image processors but the print job image processor in question to process other print jobs.

In accordance with this invention, the initiator and target capabilities of the interface bus between the SCHEDULER and the image processors are utilized to transfer a rasterized image or page from an image processor through other image processors, without data manipulation, to one or more free print engines. This allows the utilization of the available print engines without utilizing the data manipulation resources of additional image processors; therefore, the image processors remain available to apply one or more computer algorithms to additional data files creating additional rasterized digital image data files for the print engines.

These objects and advantages are realized in a system for distributing print jobs received from a print image data source among a set of print engines and associated image processors of the type having an input data bus; a scheduler coupled to said input data bus for receiving encoded data from a print image data source; a set of image processors and associated print engines each coupled to one another by a print engine data bus; and a distributed network bidirectional data bus coupled to the scheduler and to each image processor in parallel arrangement, employing the improved method comprising the steps of: transferring the encoded data received in said scheduler to one of said image processors that is not currently processing received encoded data; processing the encoded data in said transferee image processor to develop a set of print engine operating data files representing print images and pages comprising a complete print job, together with data indicating the number of copies of each such image or page to be printed and the medium on which it is to be printed; identifying print engines that are free and capable of printing images or pages of the print order; and distributing the print engine operating data files on the distributed network bidirectional data bus to the free print engines through their respective image processors until all images or pages of the print order are printed.

The method and apparatus of the present invention offers advantages over previous methods in that: (1) one image processor can apply the required algorithms to prepare a data file(s) to be printed for multiple print engines; and (2) multiple print engines can be used to print multiple copies of an image. These advantages can be realized without the cost and complexity of multiple or high band width connections between image processors and print engines.

BRIEF DESCRIPTION OF THE DRAWINGS

The above and still further objects, features, and advantages of the present invention will become apparent from the following detailed description of the preferred embodiments, taken in conjunction with the accompanying drawings in which like elements are referenced by like numbers, and in which.

DESCRIPTION OF THE PREFERRED EMBODIMENTS

Figure 1:
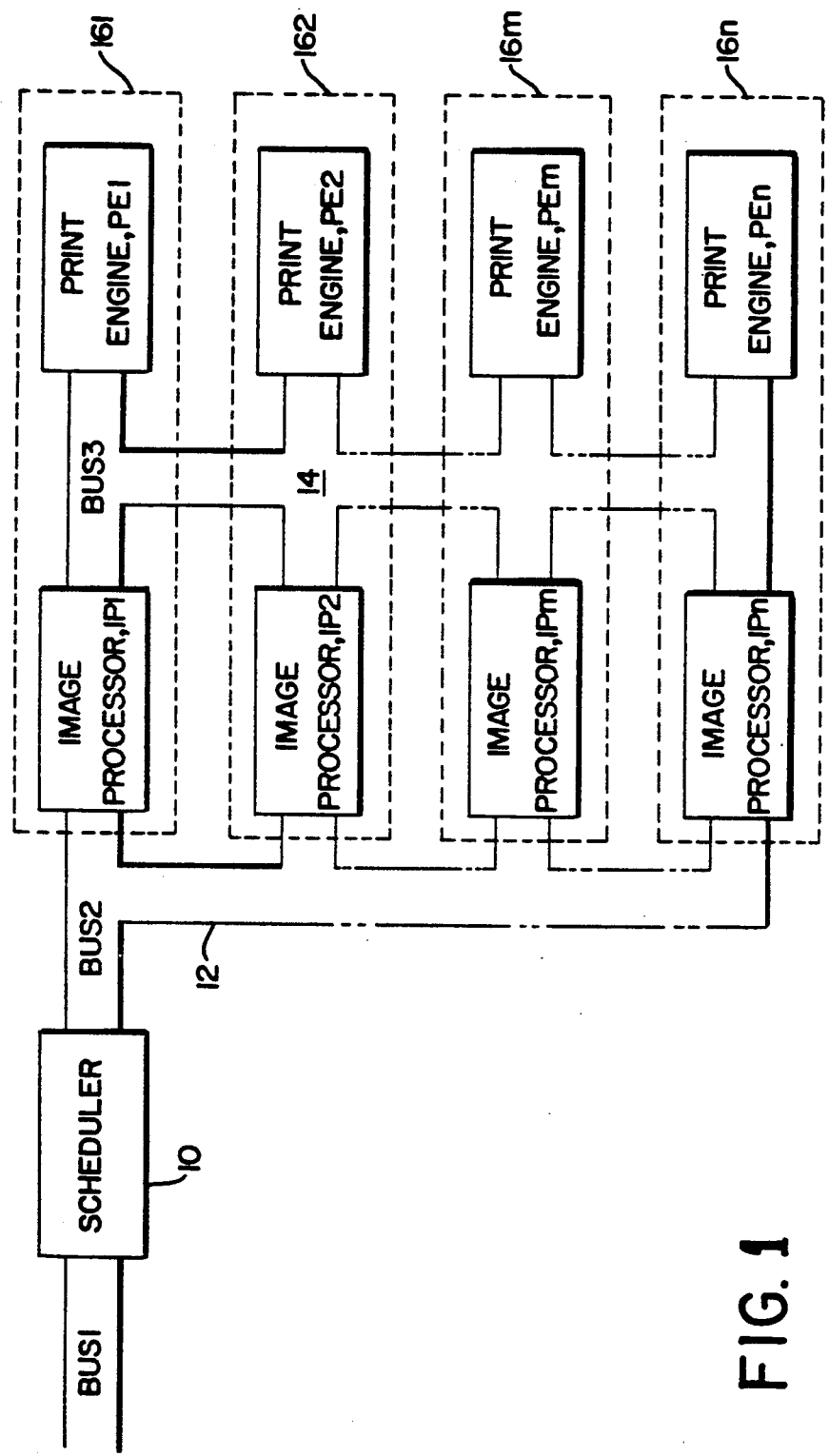
FIG. 1 is a block diagram of a first embodiment of an interconnection architecture and method of distributing print jobs among n print engines.
Figure 2:
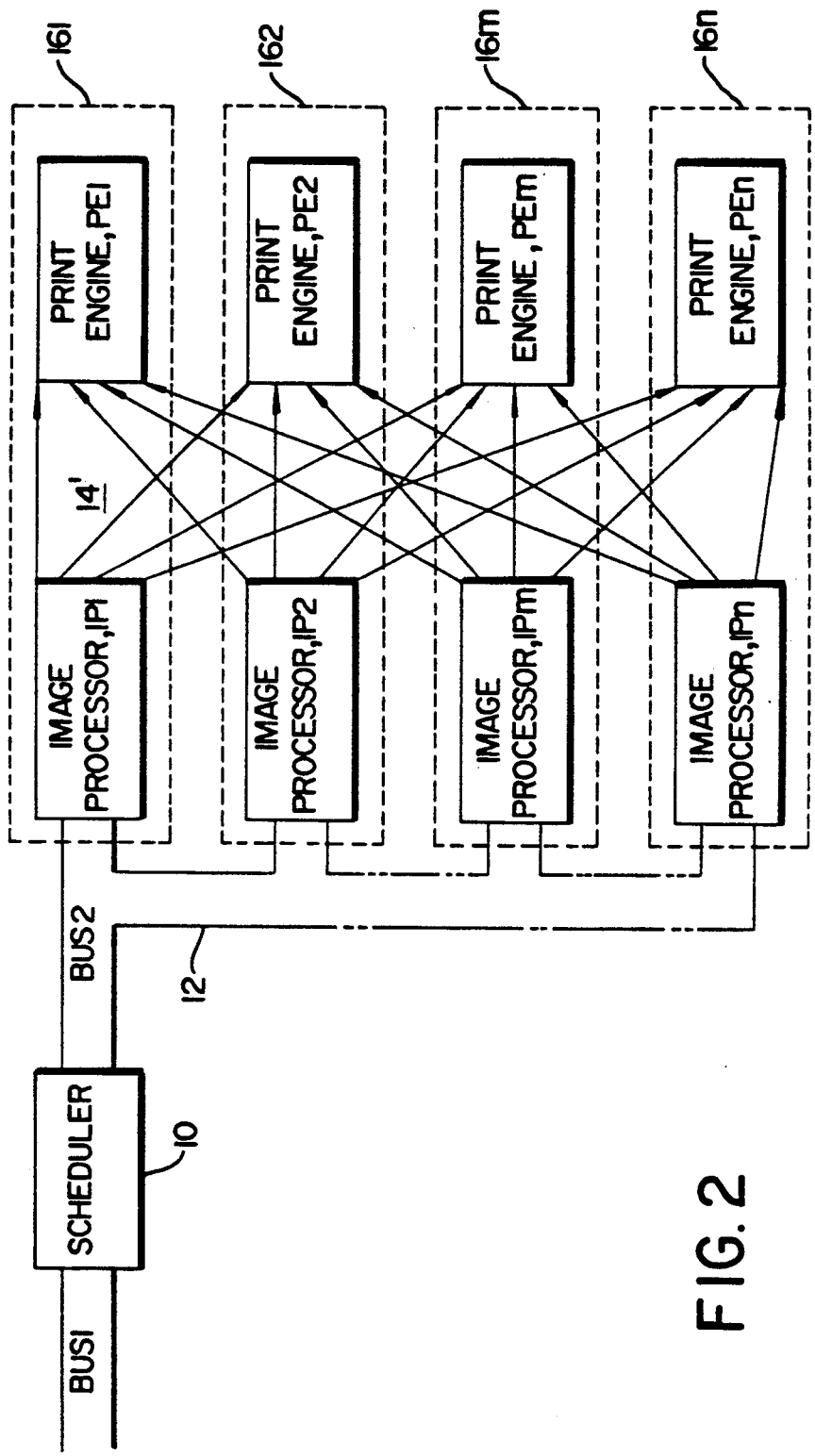
FIG. 2 is a block diagram of a second embodiment of an interconnection architecture and method of distributing print jobs among n print engines.
Figure 3:
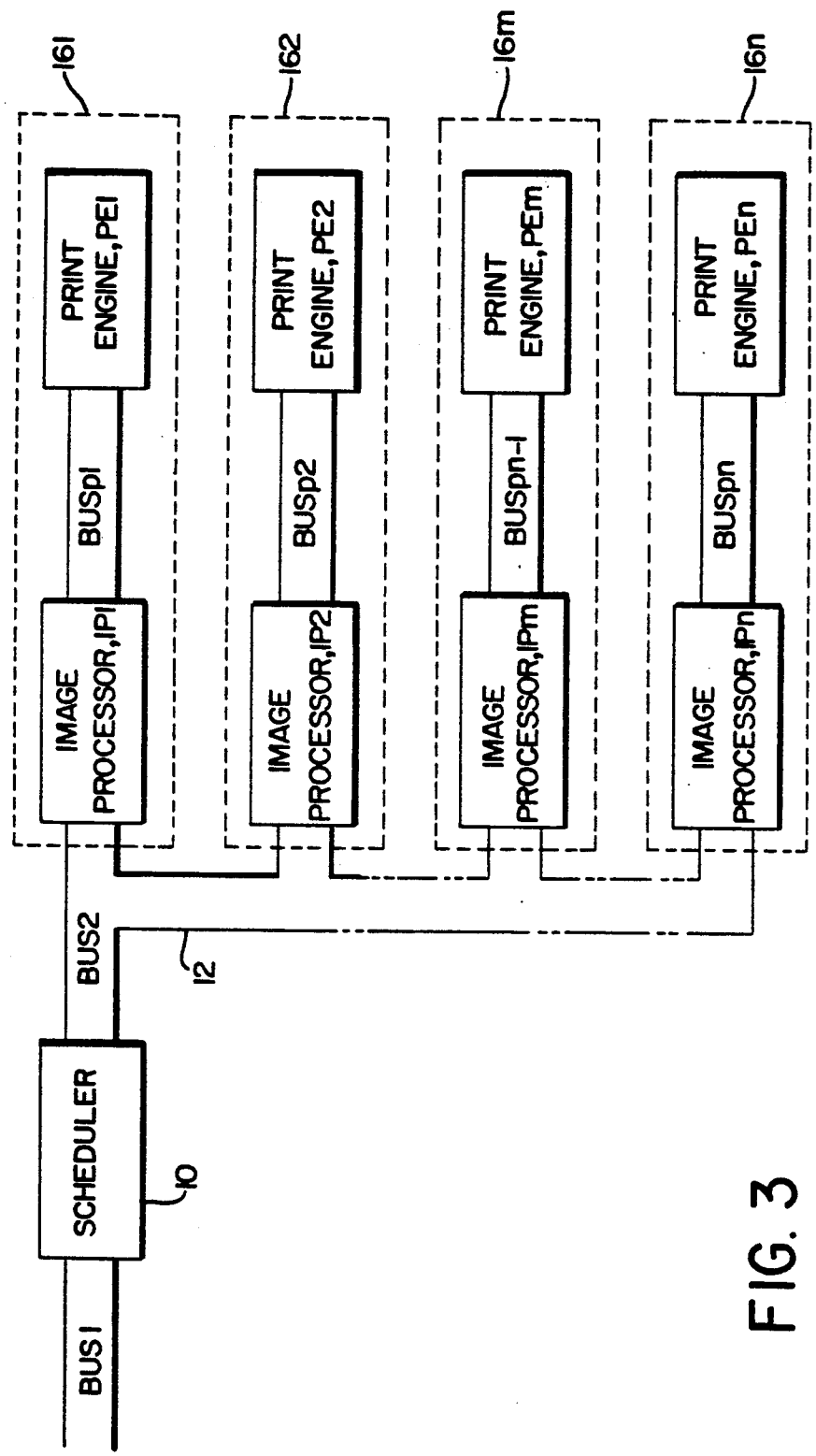
FIG. 3 is a block diagram of the preferred embodiment of an interconnection architecture and method of distributing print jobs among n print engines.

The printer systems of the present invention are partitioned into functional blocks having the resources necessary to perform the functions dedicated to the functional blocks illustrated in FIGS. 1-3. Interconnect busses connect the functional blocks to pass the data and control information resulting from a function to the subsequent function. Architectures of this form are commonly referred to as distributed architectures. This description assumes that a job consists of multiple copies of only one page or image. However, it can easily be expanded to multiple copies of multiple images.

One or more data files, containing the information required to print one or more copies of an image, are submitted into the SCHEDULER 10 through BUS1 (designated as 12). The SCHEDULER interprets the job control information in the data file(s) for the image and passes the data file(s) to an image processor, IPm, through the interconnect bus, BUS2. The SCHEDULER selects the image processor, IPm, if IPm is available and if IPm is connected to a print engine, PEm, capable of printing the image. The print engine capability is determined by a match in the paper size and other characteristics required for the print. The image processor, IPm, applies one or more computer algorithms to the data file(s) to create a data file(s) suitable for the print engine, PEm. On completion of the data file for the print engine, PEm, the data file is transferred to the print engine, PEm, through interconnect bus, BUSpm, when PEm is available. Print engine, PEm, then prints one or more copies of the image as requested when the data file(s) were submitted into the SCHEDULER 10.

An improvement in multiple printer system performance can be provided through the connection of multiple print engines, PE1-PEn, to the image processors, IP1-IPn depicted in FIGS. 1 and 2 as 16l-16n. The interconnection depicted in FIG. 1 uses a common interconnect BUS3 (designated as 14) to connect all print engines, IP1-IPn, to all image processors, IP1-IPn; however, this interconnection operating method is not preferred because the data rate required to pass every image on a common interconnection exceeds the specifications of reasonably priced common interfaces.

The interconnection depicted in FIG. 2 requires multiple interfaces 14' in either or both the image processors, IP1-IPn, and the print engines, PE1-PEn. The multiple interfaces 14' are also not preferred because they increase the system cost and complexity. In a system with n image processors, IP1-IPn, and n print engines, PE1-PEn, the system requires $2n^2$ interfaces to practice the interconnection operating method of FIG. 2.

The preferred embodiment of the present invention depicted in FIG. 3 uses the initiator and target capabilities of the interface BUS2 (designated as 12) between the SCHEDULER 10 and the image processors to transfer a rasterized image from an image processor IP1-IPn through other image processors, without data manipulation, to one or more free print engines PE1--PEn. This allows the utilization of the available print engines without utilizing the data manipulation resources of additional image processors; therefore, the image processors remain available to apply one or more computer algorithms to additional data files creating additional rasterized digital video image data files for the print engines.

This preferred embodiment of the present invention provides an optimal utilization of the functional blocks 16l-16n through utilizing the capabilities of the interface bus, BUS2. Assume, for this description, that the interconnect bus is an SCSI implementation. Devices connected to the SCSI bus can be initiators, targets or both. Many other standard interconnect busses, such as ETHERNET, MULTIBUS, VME, etc. have the same capabilities. An initiator is a device connected to the bus that can transfer data between itself and another device. A target is a device that can receive data from an initiator. A device that is both an initiator and a target can transfer data between itself and another device or accept data from another initiator. By designing the connections of the SCHEDULER 10 and the image processors, IP1-IPn, to the SCSI bus, BUS2, such that the image processors are both initiators and targets, the printer becomes capable of transferring data file(s) to multiple print engines, PE1-PEn.

After the image processor, IPm, applies one or more computer algorithms to the data file(s) to create a data file(s) suitable for the print engine, PEm, the image processor, IPm, informs the SCHEDULER 10 that the data file(s) are suitable for printing and the number of copies of the image that have been requested. The SCHEDULER 10 then determines the number of copies to be printed by print engine, PEm, and the number of copies to be printed by other available print engines, PF1-PEn. The number of copies for each available printer is passed back to the image processor, IPm. IPm then becomes an initiator on BUS2 and transfers the data file(s) to the image processor(s), IP1-IPn, connected to the available print engines, PE1-PEn, as determined by the SCHEDULER. The image processor(s), IP1-IPn, pass the data directly to the target print engines without processing. This allows the data file(s) to be processed once by the image processor, IPm, allowing the other image processors to process data files for other images. Available print engines are utilized to print multiple copies of an image without implementing a complex bus structure as in FIG. 1 or FIG. 2. The interconnect band width requirement for BUS2, in FIG. 3, is less stringent than that for BUS3, in FIG. 2, because the data file(s) suitable for the print engines, PE1-PEn, are only passed on BUS2 when some large number of copies is requested. The files for all images would have to pass through BUS3, in FIG. 1, to reach the print engines, PE1-PEn. BUS3, therefore, requires a higher bandwidth than BUS2.

Figure 4:
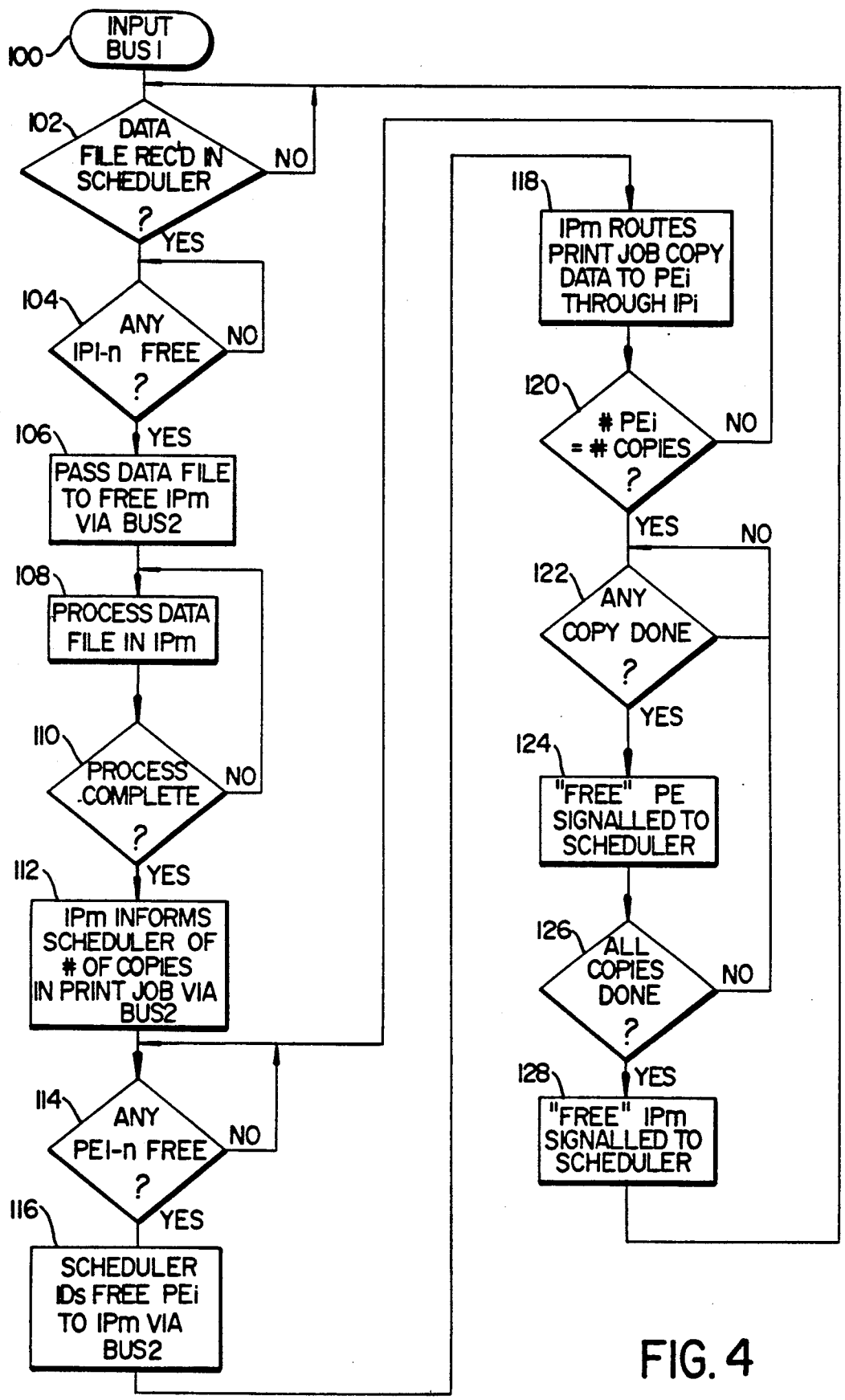
FIG. 4 is a flow chart illustrating the method of operating the system architecture of FIG. 3.

Turning now to the flow chart of FIG. 4, it illustrates the method of operating the system of FIG. 3 as described above. The data file at start block 100 on BUS1 is received in the SCHEDULER 10 in decision block 102 which determines in decision block 104 whether or not any image processor IP1-n is free. If one is free, then the data is passed in block 106 on BUS2 to the free image processor IPm.

The data file that was passed to the free image processor is processed in block 108 and when the process is complete is indicated by decision block 110, the image processor IPm informs the SCHEDULER of the number of copies contained in the print job via BUS2 in block 112.

The SCHEDULER determines whether an print engine PE1-n is free in block 114 and provides the identify of the free print engines to the designated image processor IPm via BUS2 in block 116. The designated image processor IPm routes the print job copy data to the designated print engine PE1 through its associated image processor IP1 in block 118. This process continues until the number of identified free print engines PE1 equal the number of copies required as determined in decision block 120. At the same time, decision block 122 determines whether any of the copies are done and if they are a free PE1 indication is signaled to the SCHEDULER in block 124. The free PE1 may be employed and continued designation of print engines in block 116 until the designated number of copies is completed as indicated in decision block 120. When all copies are completed as determined in decision 126, the designated image processor IPm is freed and that condition is signaled to the SCHEDULER in block 128. Thereafter, the program loops back to the start block 100.

While this process is taking place, further print orders may be received and distributed by the SCHEDULER depending on the priority commands accompanying the print order. If the queuing of print orders is governed by FIFO, then the print order in process would be completed before commencing the printing of any portion of a subsequent order.

This preferred embodiment of the invention can be implemented in any printer where (1) separate functional blocks are partitioned into separate physical blocks, (2) the physical blocks are connected by a common interface bus and (3) a SCHEDULER function exists. For instance, through analysis of the individual steps required in a printing system from the time that the data first arrives to a printing system until the print is complete, separate functional steps can be determined for the printer system. Furthermore, a partitioning can occur where the functional blocks can be grouped and implemented on separate physical devices. If the functions are so partitioned, the physical blocks can be connected through a common interface bus. Several interface buses are available including ETHERNET, SCSI, FDDI, etc. This invention discloses printer systems where the functional blocks are partitioned, where an interconnect bus exists and where a scheduler function exists.

The partition of the functional blocks into an Image Processor and a Print Engine are convenient for one implementation of this invention. Other partitions could have been chosen without modifying the concept.

As an alternative to the above described embodiment of FIG. 3, the function of the SCHEDULER could be implemented in the hardware of one of the image processors resulting in either combining BUS1 and BUS2 or providing separate physical interfaces for BUS1 and BUS2.

The combinations of the image processors and the print engines can be implemented in one physical structure or in separate physical structures.

Although exemplary embodiments of the method and apparatus of the present invention have been shown and described many changes, modifications and substitutions of equivalent structure and operating steps may be made by one of ordinary skill in the art without necessarily departing from the spirit and scope of this invention as defined by the appended claims.

What is claimed is:

1. In a system for distributing print jobs received from a print image data source among a set of print engines and associated image processors of the type having an input data bus; a scheduler coupled to said input data bus for receiving encoded data from a print image data source; a set of image processors and associated print engines each coupled to one another by a print engine data bus; and a distributed network bidirectional data bus coupled to the scheduler and to each image processor in parallel arrangement, the improved method comprising the steps of:

transferring the encoded data of a print job received in said scheduler to one of said image processors that is not currently processing received encoded data;

processing the encoded data in said transferee image processor to develop a set of print engine operating data files representing print images or pages comprising a complete print job, together with data indicating the number of copies of each such image or page to be printed and the medium on which it is to be printed;

identifying print engines that are free and capable of printing images or pages of the print order; and distributing the print engine operating data files on the distributed network bidirectional data bus to the free print engines through their respective image processors until all images or pages of the print order are printed.

2. The method of claim 1 further comprising the steps of:

repeating each of the steps of the method with respect to each print job received in the scheduler, before a previous print job is completed, to provide for the simultaneous printing of images or pages of more than one print job by print engines that become free in the process of printing a previous print job.

3. The method of claim 2 further comprising the steps of:

using the initiator and target capabilities of the interface bus between the scheduler and the image processors to transfer a rasterized image from said transferee image processor through said other image processors, without data manipulation, to said one or more free print engines, thereby allowing the utilization of the available print engines without utilizing the data manipulation resources of said other image processors which, therefore, remain free to apply one or more computer algorithms to additional data files creating additional rasterized digital video image data files for other free print engines.

4. In a system for distributing print jobs received from a print image data source among a set of print engines and associated image processors of the type having an input data bus; a scheduler coupled to said input data bus for receiving encoded data from a print image data source; a set of image processors and associated print engines each coupled to one another by a print engine data bus; and a distributed network bidirectional data bus coupled to the scheduler and to each image processor in parallel arrangement, the improvement comprising:

means for transferring the encoded data of a print job received in said scheduler to one of said image processors that is not currently processing received encoded data;

means for processing the encoded data to develop a set of print engine operating data files representing print images or pages comprising a complete print job, together with data indicating the number of copies of each such image or page as to be printed and the medium on which it is to be printed;

means for identifying print engines that are free and capable of printing images or pages of the print order; and means for distributing the print engine operating data files on the distributed network bidirectional data bus to the free print engines through their respective image processors until all images or pages of the print order are printed.

5. The apparatus of claim 4 further comprising:

means for simultaneously printing images or pages of more than one print job by print engines that become free in the process of printing a previous print job.

* * * * *